United States Patent [19]

Sollars

[11] Patent Number: 5,799,164
[45] Date of Patent: Aug. 25, 1998

[54] METHOD AND APPARATUS FOR PREFETCHING INSTRUCTIONS AT AN IMPROVED RATE BASED ON DISPATCHED CONTROL TRANSFER INSTRUCTION STATES

[75] Inventor: Donald L. Sollars, Milpitas, Calif.

[73] Assignee: Sun Microsystems, Inc., Mountain View, Calif.

[21] Appl. No.: 821,268

[22] Filed: Mar. 20, 1997

Related U.S. Application Data

[63] Continuation of Ser. No. 283,097, Jul. 29, 1994, abandoned.

[51] Int. Cl.$^6$ ............................................. G06F 9/38
[52] U.S. Cl. ............................................. 395/383; 395/587
[58] Field of Search ............................. 395/384, 387, 395/389, 383

[56] References Cited

U.S. PATENT DOCUMENTS

| | | | |
|---|---|---|---|
| 4,742,451 | 5/1988 | Bruckert et al. | 364/200 |
| 5,442,756 | 8/1995 | Grochowski et al. | 395/375 |
| 5,454,117 | 9/1995 | Puziol et al. | 395/800 |
| 5,524,224 | 6/1996 | Denman et al. | 395/375 |
| 5,530,825 | 6/1996 | Black et al. | 395/421.03 |
| 5,606,676 | 2/1997 | Grochowski et al. | 395/586 |

*Primary Examiner*—Ayaz R. Sheikh
*Attorney, Agent, or Firm*—Blakely Sokoloff Taylor & Zafman

[57] ABSTRACT

An improved prefetch program counter (PC) generation circuitry is provided to the prefetch and dispatch unit (PDU) of a pipelined computer system. The prefetch PC generation circuitry factors into consideration the states of dispatched CTIs in various pipeline stages, when generating a new prefetch PC value for instruction prefetching. The dispatched CTI state dependent prefetch PC generation circuitry includes storage circuitry, fetch control circuitry, and fetch PC generation circuitry. Together, the storage circuitry, the fetch control circuitry, and the fetch PC generation circuitry cooperate to prefetch instructions in a CTI state dependent manner, thereby improving the instruction prefetch rate. In one embodiment, two dynamically switchable instruction fetch queues are provided, with one being used as the sequential instruction fetch queue, and the other being used as the target instruction fetch queue.

20 Claims, 7 Drawing Sheets

36

39 — Dispatched CTI State Table

| B0 | B1 | B2 | B3 |
| B4 | B5 | B6 | B7 |
| B8 | B9 | B10 | B11 |

*Figure 5*

METHOD AND APPARATUS FOR PREFETCHING INSTRUCTIONS AT AN IMPROVED RATE BASED ON DISPATCHED CONTROL TRANSFER INSTRUCTION STATES

This is a continuation of application Ser. No. 08/283,097, filed Jul. 29, 1994, now abandoned.

BACKGROUND OF THE INVENTION

1. Field of the Invention:

The present invention relates to the field of computer systems. More specifically, the present invention relates to instruction prefetch and dispatch methods and apparatus of computer systems.

2. Background Information:

Historically, instruction fetch and dispatch units, and execution units of computer systems fetch, decode, and execute instructions sequentially in program order, one instruction at a time. In other words, an instruction fetch and dispatch unit will fetch and decode an instruction, and then wait for the execution unit to complete execution of the instruction before fetching and decoding another instruction. Under this sequential approach, whether a preceding conditional control transfer instruction (CTI) will be taken or not, and if taken, what is the target address, will both be known at the time the next instruction is fetched. Thus, there is no problem with knowing which is the next instruction to be fetched, and where is it located in memory.

To improve performance, instruction fetch and dispatch units, and execution units of some computer systems pipeline the fetching, decoding, and execution of instructions. In other words, while a first instruction is being executed, a second instruction is being decoded in preparation for execution, and a third instruction is being fetched for decoding. The instructions will move through the fetch, decode, and execute pipeline stages in an orderly manner. In some computer systems, the basic fetch, decode, and execute pipeline stages are further broken down into sub-stages, thereby allowing even more instructions to be moving through the pipeline at the same time. Under this pipelined approach, whether a preceding conditional control transfer instruction (CTI) will be taken or not, and if taken, what is the target address, will not necessarily be known at the time a subsequent instruction is fetched. In order to keep the pipeline filled, instead of temporarily suspending instruction fetching and decoding when a CTI is encountered, most pipelined computer systems employ some type of prediction algorithms to predict which direction execution control will be transferred, and continue instruction fetching, decoding, and execution along the predicted direction. If the prediction subsequently turns out to be incorrect, the execution results are purged; instruction fetching, decoding, and execution is then redirected to the correct direction.

Since instruction fetching involves reading the instructions in from memory, which is a "slow" process, as compare to instruction execution by the execution unit, most instruction fetch and decode units of pipelined computer systems will pre-fetch instructions to ensure adequate supply of instructions are available to keep the pipeline filled. The prefetched instructions are partially or totally purged as appropriate, when incorrect execution control transfer prediction is detected.

In recent years, many pipelined computer systems have also gone "superscalar", i.e. being capable of executing instructions in groups, thereby further improving execution throughput. Thus, it is desirable to have an instruction prefetch and dispatch unit that can keep up with the improved throughput of the execution unit on a "superscalar" computer system, by intelligently looking and prefetching further ahead downstream than its counterpart in a "regular" pipelined computer system. Additionally, this trend of ever increasing execution throughput is further accelerated by continuing increase of processor speeds of the "superscalar" computer systems, thus making the ability of intelligently looking and prefetching far ahead downstream to be even more desirable.

As will be disclosed in detail below, the present invention provides a method and apparatus for prefetching instructions that achieves these and other desired results.

SUMMARY OF THE INVENTION

The desired results are advantageously achieved by providing prefetch program counter (PC) generation circuitry to the prefetch and dispatch unit (PDU) of a computer system, that factors the states of dispatched CTIs in the various pipeline stages into consideration, in generating the prefetch PC value. The prefetch PC generation circuitry comprises storage circuitry, fetch control circuitry, and fetch PC generation circuitry. The storage circuitry stores state control information about the dispatched CTIs in the various pipeline stages. The fetch control circuitry generates control signals to control the fetch PC generation circuitry in view of the state control information stored. The fetch PC generation circuitry generates the fetch PC values under the control of the fetch control circuitry.

In one embodiment, the PDU is further provided with two instruction fetch queues, an instruction dispatch queue, and associated queue control and dispatch circuitry. The two instruction queues store the instructions being prefetched based on the prefetch PC value generated by the prefetch PC generation circuitry of the present invention. The instruction dispatch queue selectively receives and stores the instructions being dispatched, from either one of the two instruction fetch queues or the instruction cache bypassing the two instruction fetch queues, under the control of the associated queue control and dispatch circuitry. The associated queue control and dispatch circuitry controls the queues and instruction dispatching, in particular, dynamically designating one of the two instruction fetch queues as the sequential instruction fetch queue, and the other instruction fetch queue as the target instruction fetch queue.

BRIEF DESCRIPTION OF THE DRAWINGS

FIG. 5 illustrates the contents of the state storage circuitry of FIG. 4.

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
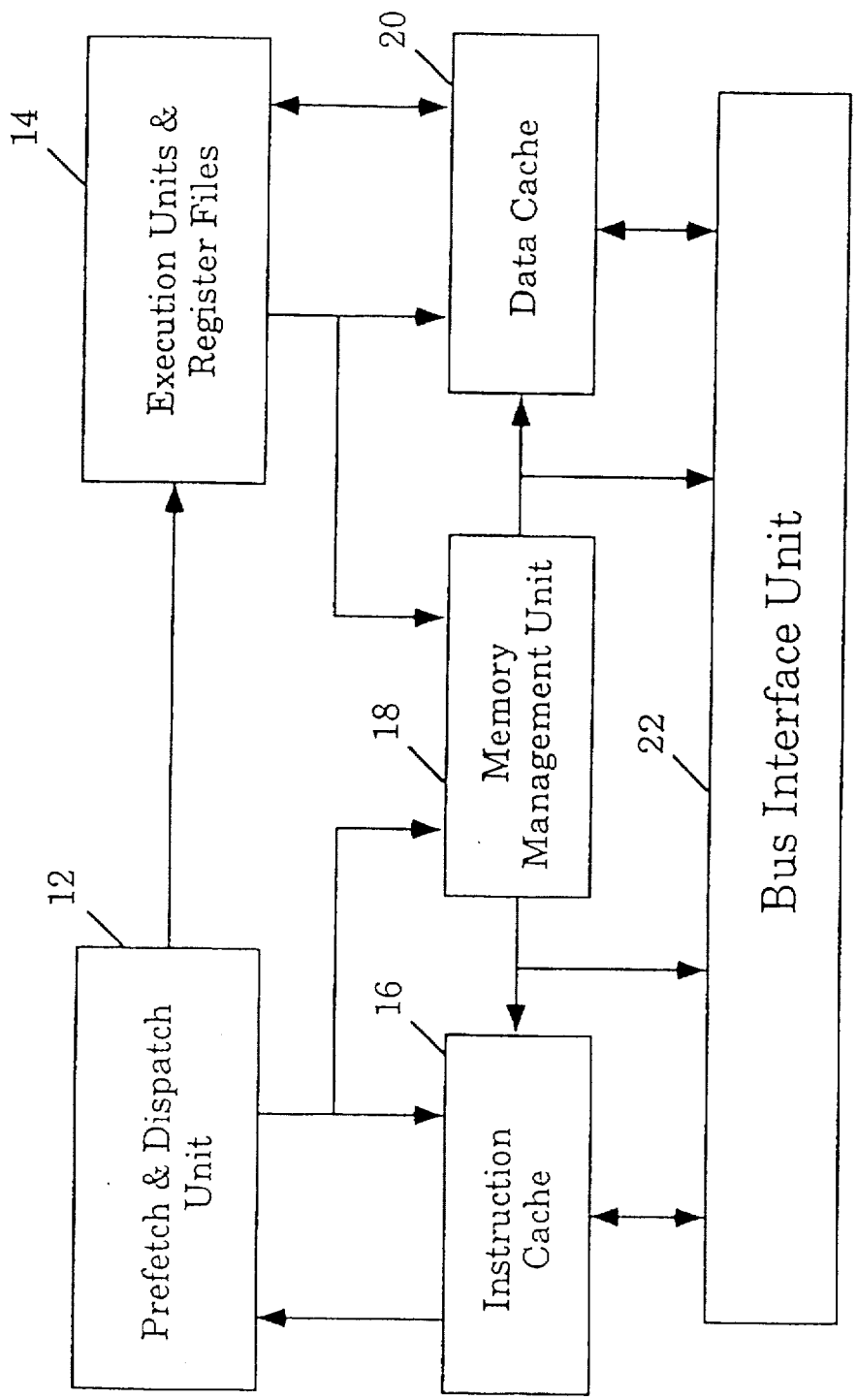
FIG. 1 is an exemplary pipelined computer system incorporating the teachings of the present invention.

Referring now to FIG. 1, a block diagram illustrating an exemplary pipelined computer system incorporating the teachings of the present invention is shown. The exemplary computer system 10 includes an instruction prefetch and dispatch unit (PDU) 12 incorporating the teachings of the present invention. Additionally, the exemplary computer system 10 further includes execution units and associated register files 14, an instruction and a data cache 16 and 20, a memory management unit 18, and a bus interface 22. The elements 12–22 are coupled to each other as shown. Cooperatively, instructions are fetched from the instruction cache 16 and system memory (not shown), and dispatched to the execution units 14 for execution. The execution results are stored back into the data cache 20, and if applicable, to the system memory. Except for the teachings of the present invention incorporated in the PDU 12, elements 14–22 are intended to represent a broad category of these elements found in most computer systems. The constitutions and basic functions are well known and will not be otherwise described further. The teachings of the present invention incorporated in the PDU 12 will be described in further detail below with additional references to the remaining figures.

Figure 2:
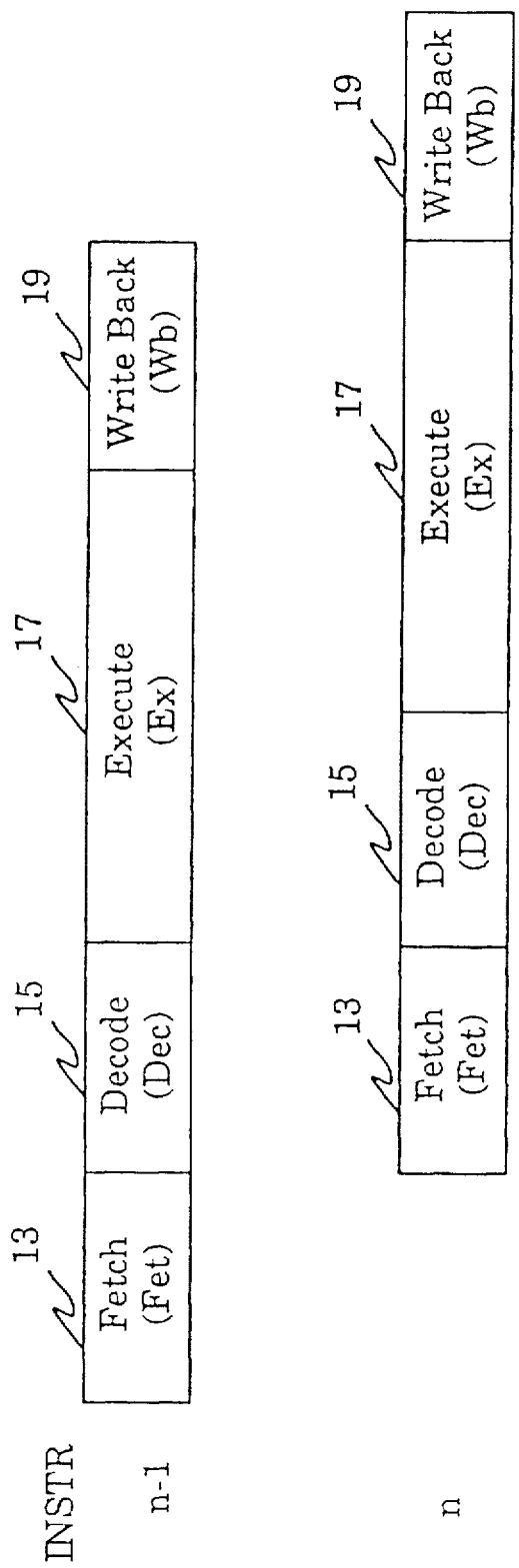
FIG. 2 illustrates pipeline stages of the exemplary computer system of FIG. 1.

Referring now to FIG. 2, a block diagram illustrating the pipeline stages of the exemplary computer systems of FIG. 1 is shown. As illustrated, at any point in time, multiple instructions are being "executed". The pipeline stages include an instruction fetch stage 13, an instruction decode stage 15, an execute stage 17, and a writeback stage 19. Instructions are fetched and decoded in the fetch and decode stages 13 and 15 respectively. Decoded instructions are executed in the execute stage 17, and the execution results are written back into storage in the writeback stage 19 respectively. The instructions moved through the pipeline sequentially in program order. While the present invention is being described with four pipeline stages, based on the descriptions to follow, it will be appreciated that the present invention may be practiced with less or more pipeline stages.

Figure 3:
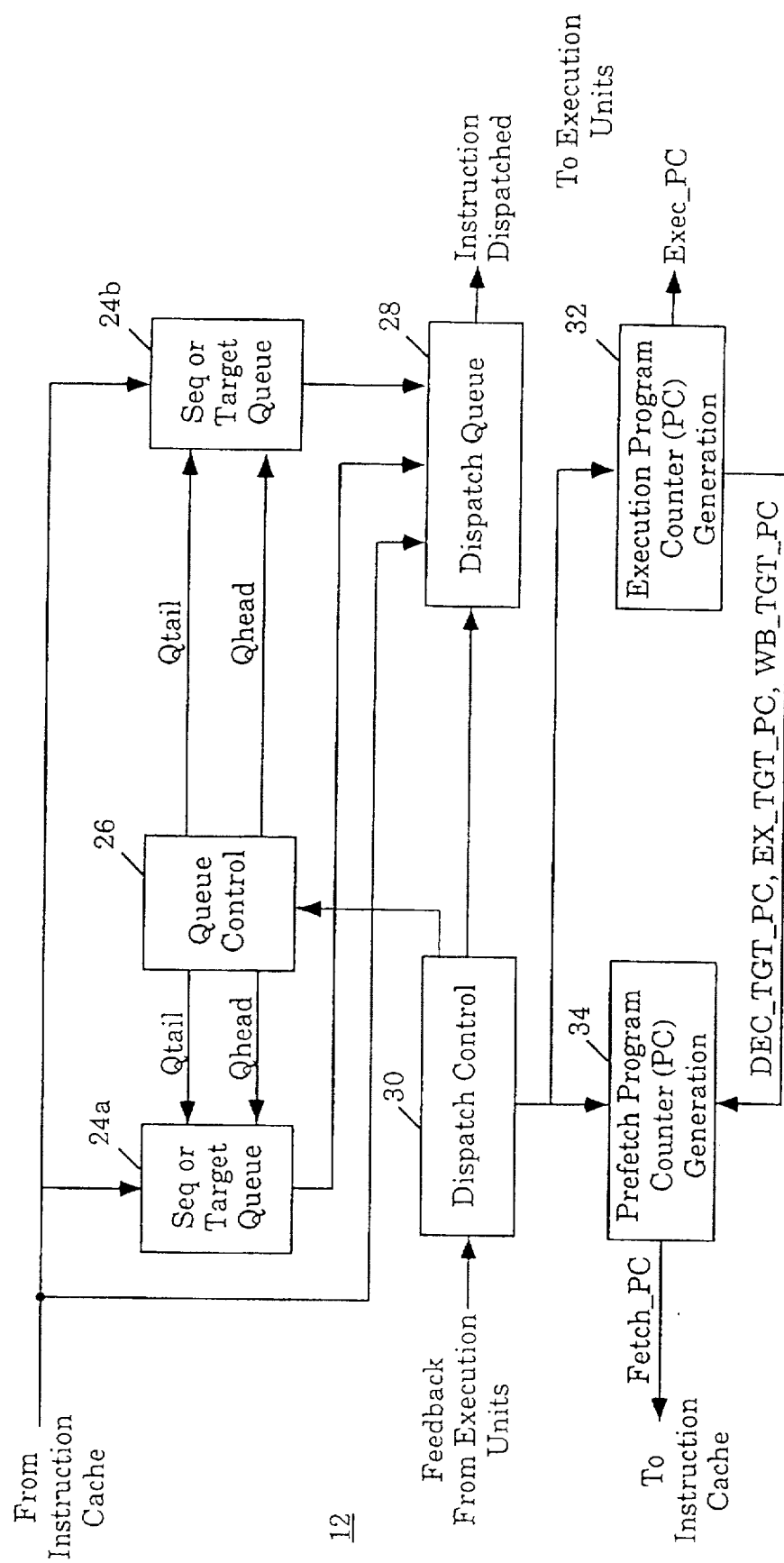
FIG. 3 illustrates the relevant portions of one embodiment of the instruction prefetch and dispatch unit of FIG. 1 in further detail.

Referring now to FIG. 3, a block diagram illustrating the relevant portions of one embodiment of the PDU 12 of FIG. 1 in further detail is shown. As illustrated, the PDU 12 includes two instruction fetch queues 24a and 24b and an instruction dispatch queue 28. Additionally, the PDU 12 includes queue control circuitry 26 and dispatch control circuitry 30. Furthermore, the PDU 12 includes execution PC generation circuitry 32 and prefetch PC generation circuitry 34. The elements 24a–24b, and 26–34 are coupled to each other, and to the instruction cache 16 and the execution units 14 as shown.

The two instruction fetch queues 24a–24b are used to store the instructions fetched from the instruction cache 16. As will be explained in more detail below, at any point in time, one of two instruction fetch queues 24a–24b is used as the sequential instruction fetch queue, whereas the other instruction fetch queue 24a or 24b is used as the target instruction fetch queue. The manner in which the two instruction queues 24a–24b are used is dynamically determined.

The instruction dispatch queue 28 is used to store the instructions being dispatched. The instruction dispatch queue 28 receives the instructions being dispatched from the instruction fetch queue 24a or 24b that is being used as the sequential instruction queue. Preferably, the instruction dispatch queue 28 can also receive instructions being dispatched from the instruction cache 16 directly by-passing the instruction fetch queues 24a–24b in the event these queues 24a–24b are empty.

The queue control circuitry 26 controls the two instruction fetch queues 24a–24b. In particular, the queue control circuitry 26 maintains the queue head pointers and the queue tail pointers of the two queues 24a–24b indicating where the next instructions to be dispatched are to be retrieved, and where the next instructions fetched are to be stored.

The dispatch control circuitry 30 controls dispatching of instructions from the dispatch queue 28. The dispatch control circuitry 30 also provides dispatch control information to the queue control circuitry 26, the execution PC generation circuitry 32, and the prefetch PC generation circuitry 34. In the illustrated embodiment, the dispatch control circuitry 30 dispatches instruction in groups of up to three (3) instructions at a time. However, there will be at most one CTI in a group of dispatched instructions.

Additionally, in one embodiment, there are two types of CTIs, non-delayed CTIs and delayed CTIs. A non-delayed control transfer changes control to the instruction at the target address immediately after the CTI is executed, whereas a delayed control transfer changes control to the instruction at the target address after a 1-instruction delay. The instruction after the delayed CTI is executed before the target of the CTI is executed. This instruction is referred to as the affiliated delay instruction (DI) of the delayed CTI.

A particular example of a computer system wherein instructions are dispatched in groups, and CTIs include non-delayed as well as delayed CTIs, is the Sparcstation 20, manufactured by Sun Microsystems, Inc., of Mountain View, Calif.

The execution PC generation circuitry 32 and the prefetch PC generation circuitry 34 generate the execution PC value and the prefetch PC value for the execution units 14 and for the instruction cache 16 respectively. The execution PC value denotes the address of instruction to be executed, whereas the prefetch PC value denotes the starting address of the next block of instructions to be prefetched.

In accordance to the present invention, the prefetch PC generation circuitry 34 generates the prefetch PC value factoring into consideration the states of the dispatched CTIs in the various pipeline stages. The execution PC generation circuitry 32 assists the prefetch PC generation circuitry 34 in doing so by providing also the target addresses of the CTIs in the various pipeline stages, i.e. the target address of the CTI in the decode stage (DEC_TGT_PC), the target address of the CTI in the execute stage (EX_TGT_PC), and the target address of the CTI in the writeback stage (WB_TGT_PC) when control transfer instructions are encountered at the various pipeline stages.

The instruction fetch queues 24a–24b, the instruction dispatch queue 28, the associated queue control circuitry 26 and 30, and the execution PC generation circuitry 32 are intended to represent a broad category of these elements found in many instruction fetch and dispatch units of computer systems, including but not limited to the instruction fetching and dispatching elements described in copending U.S. patent application, Ser. No. 07/875,373, entitled "Methods And Apparatus For Grouping Multiple Instructions, Issuing Grouped Instructions Simultaneously, And Executing Grouped Instructions In A Pipelined Processor", which is hereby fully incorporated by reference. The prefetch PC generation circuitry 34 will be described in more detail below with additional references to the remaining figures.

Figure 4:
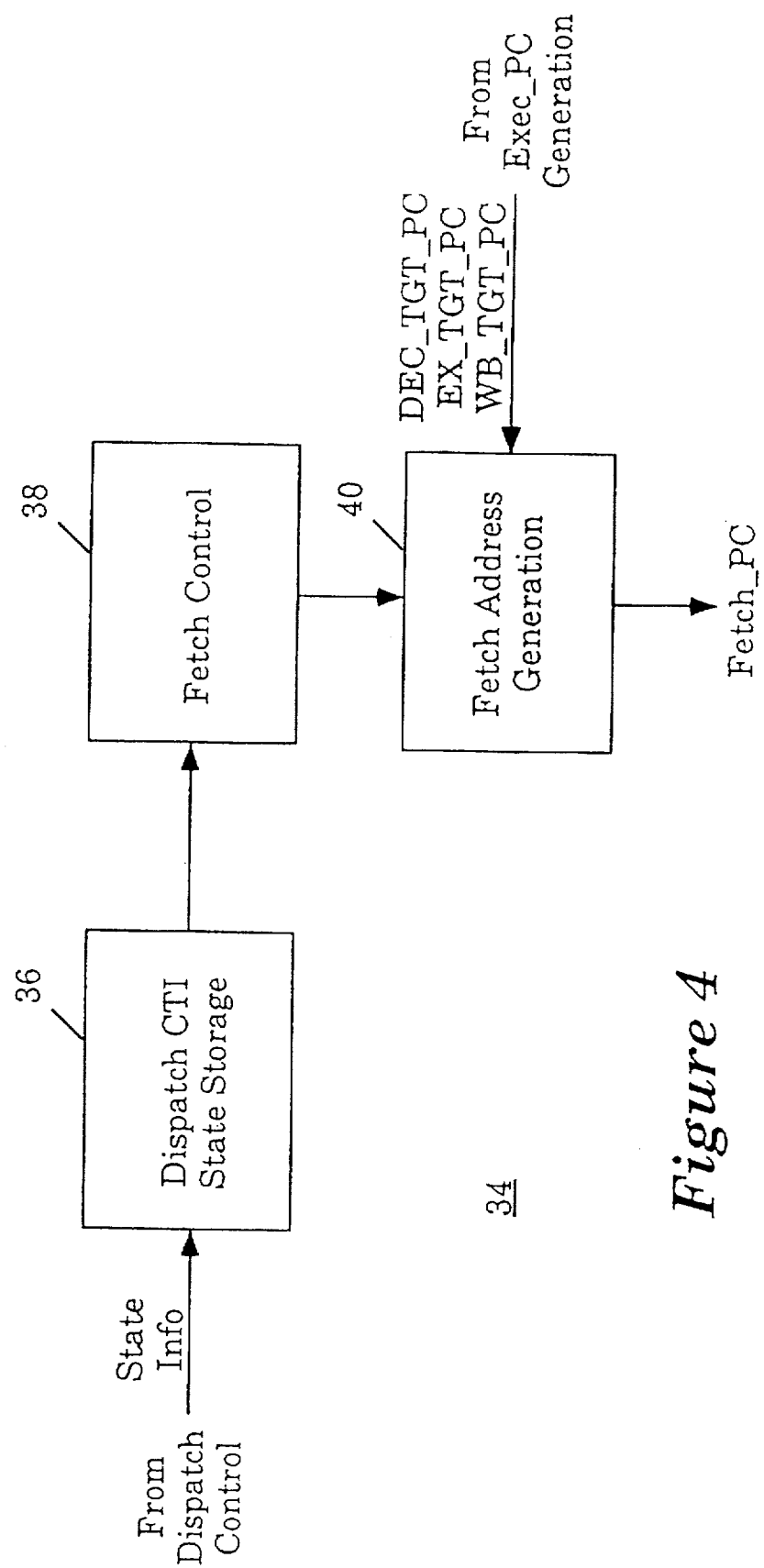
FIG. 4 illustrates the relevant portions of one embodiment of the prefetch program counter generation circuitry of the present invention.

Referring now to FIG. 4, a block diagram illustrating the relevant portions of one embodiment of the prefetch PC generation circuitry 34 of FIG. 3 in further detail is shown. As illustrated, the prefetch PC generation circuitry 34 includes storage circuitry 36, fetch control circuitry 38, and fetch address generation circuitry 40. These elements 34–40 are coupled to each other as shown. The storage circuitry 36 stores state information of the dispatched CTIs provided by the dispatch control circuitry 30. The fetch control circuitry 38 generates control signals for the fetch address generation circuitry 40 based on the stored state information of the dispatched CTIs. The fetch address generation circuitry 40 generates the fetch PC value under the control of fetch control circuitry 38, using the target addresses of the CTIs in the various pipeline stages, if provided by the execution PC generation circuitry 32.

Having now described the architectural relationship of the key circuitry of the prefetch PC generation circuitry 32 of the present invention, the content of the storage circuitry 36 and the constitution of the fetch address generation circuitry 40 will be described first with references to FIGS. 5 and 6. Then, the control logic of the fetch control circuitry 38 will be described with references to FIG. 7, showing how the contents of the storage circuitry 36 are used to control the operation of the fetch address generation circuitry 40.

Referring now to FIG. 5, a diagram illustrating the content of the storage circuitry 36 of FIG. 4 is shown. As described earlier, the storage circuitry 36 stores the state information of the dispatched CTIs in the various pipeline stages. The dispatched CTI state storage circuitry 36 may be designed using a number of well known, preferably high speed, implementations, such as SRAM. In one embodiment, the storage circuitry 36 stores the state information in a single dispatched CTI state table 39, organized as a 3×4 matrix, having 12 bits, B0 through B11. The meanings of B0 and B11 are described below, and their usage will be described later in conjunction with the control logic of the fetch control circuitry 38.

B0, when set, indicates that a CTI is in the writeback stage. B11, when set, indicates that the CTI in the writeback stage is a delayed CTI and the affiliated DI is valid. B2, when set, indicates that the CTI in the writeback stage is taken. B3, when set, indicates the target instruction at the address of the CTI in the writeback stage is valid.

Similarly, B4, when set, indicates that a CTI is in the execution stage. B5, when set, indicates that the CTI in the execution stage is a delayed CTI, and the affiliated DI is valid. B6, when set, indicates that the CTI in the execution stage is taken. B7, when set, indicates the target instruction at the address of the CTI in the execution stage is valid.

Likewise, B8, when set, indicates that a CTI is in the decode stage. B9, when set, indicates that the CTI in the decode stage is a delayed CTI and the affiliated DI is valid. B10, when set, indicates that the target address of the CTI in the decode stage is valid. B11, when set, indicates the target instruction at the address of the CTI in the decode stage is valid.

Figure 6:
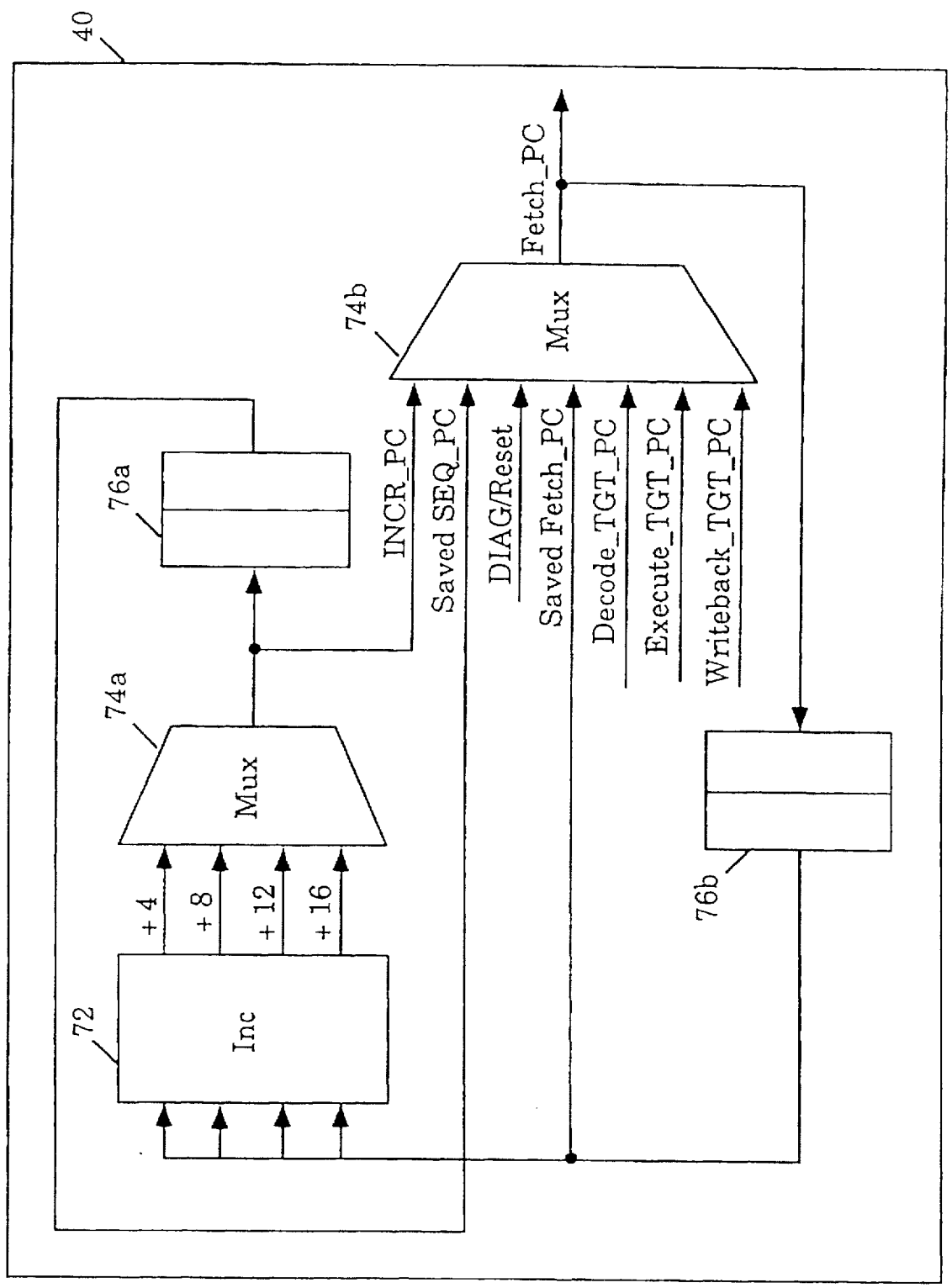
FIG. 6 illustrates the operation flow of the fetch control circuitry of FIG. 4.
Figure 7:
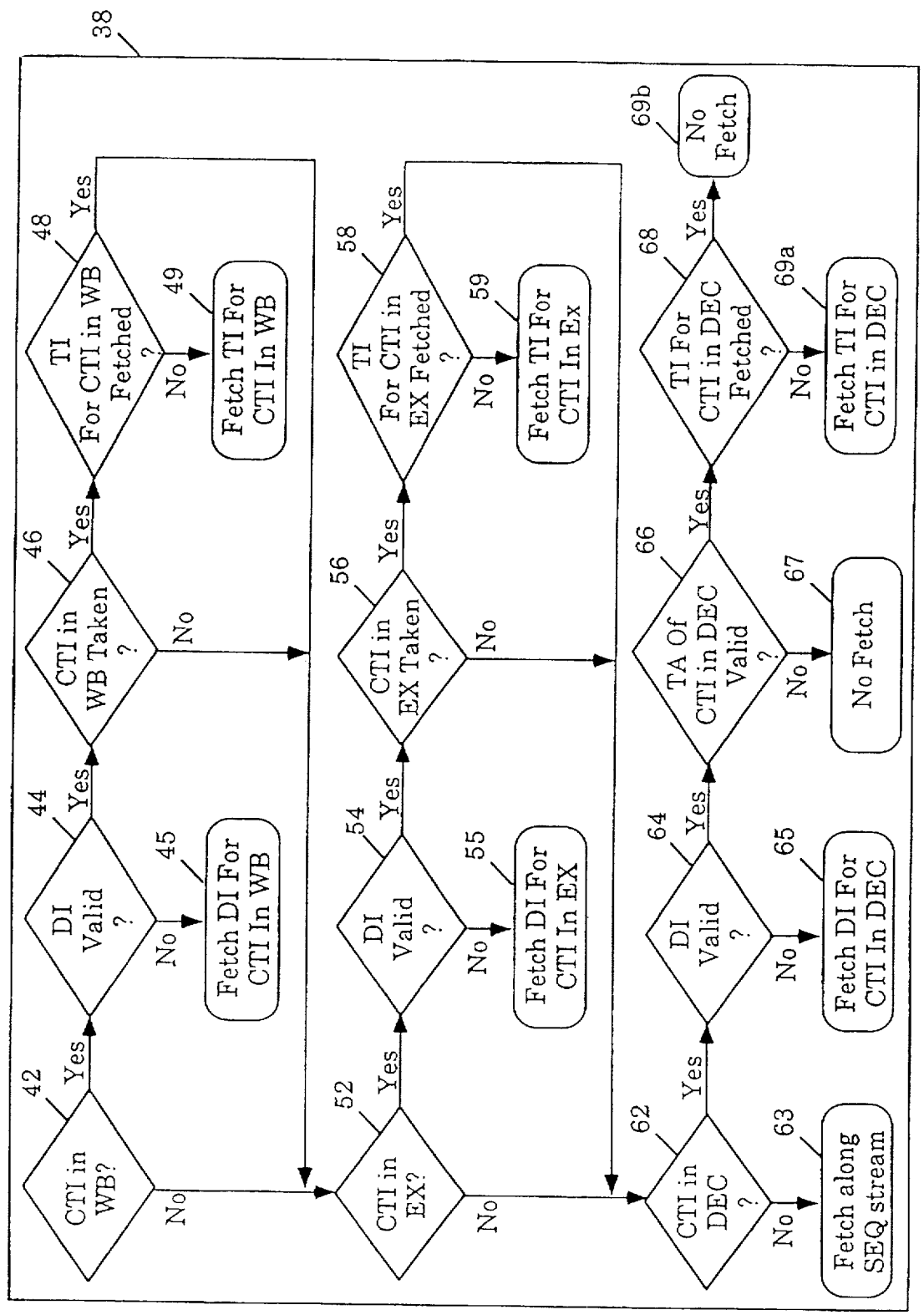
FIG. 7 illustrates the relevant portions of one embodiment of the fetch PC generation circuitry of FIG. 4 in further detail.

Referring now to FIG. 6, a block diagram illustrating the relevant portions of one embodiment of the fetch address generation circuitry 40 of FIG. 4 in further detail is shown. As described earlier, the fetch address generation circuitry 40 generates the fetch PC value for instruction fetching. The fetch address generation circuitry 40 includes an incrementer 72, two multiplexors 74a–74b, and two latches 76a–76b. Their organization and relationship are described below, and their usage will be described later in conjunction with the control logic of the fetch control circuitry 38.

The second latch 76b is used to store the sequential fetch PC value (Saved Fetch_PC) just issued. The stored Saved Fetch_PC is used to calculate the potential incremented sequential PC values for the different cases of number of instructions included in the most recent dispatched group. The stored Saved Fetch_PC may also be selected for reissuance as the new fetch PC.

The incrementor 72 is used to generate four potential incremented sequential PC values off the Saved Fetch_PC value, one of each of the four possibilities of the number of instructions in the most recent dispatched group, i.e. zero, one, two, or three instructions. The first multiplexor 74a is used to select one of the four incremented sequential PC values as the proper incremented sequential PC value (INCR_PC) for the second multiplexor 74b, under the control of fetch control circuitry 38. The first latch 76a is used to store the INCR_PC for subsequent reissuance as the saved sequential PC (Saved SEQ_PC).

Lastly, in addition to the Saved Fetch_PC, the Saved SEQ_PC, and the INCR_PC, the second multiplexor 74b further receives the DEC_TGT_PC, EX_TGT_PC and WB_TGT_PC, and preferably a diagnostic or reset program counter value (DIAG/Reset) as inputs. Recall from earlier discussions that DEC_TGT_PC, EX_TGT_PC and WB_TGT_PC are the target addresses of the CTIs in the decode, execute, and writeback stages, provided by the execution PC generation circuitry 34. The second multiplexor 74b generates the next fetch PC value (Fetch_PC) by selecting one of the received inputs, under the control of the fetch control circuitry 38.

Referring now to FIG. 7, a block diagram illustrating the operation flow of the fetch control circuitry 38 of FIG. 4 is shown. All decisions made by the fetch control circuitry 38 described below are made by the fetch control circuitry 38 examining the dispatched CTI state information stored in the storage circuitry 36, and all control signals are generated for the fetch address generation circuitry 40. The fetch control circuitry 38 may be implemented with any number of combinatorial logics well known in the art.

As illustrated, in each clock cycle, the fetch control circuitry 38 first determines whether a CTI is in the writeback stage, by examining B0, step 42. If a CTI is in the writeback stage, the fetch control circuitry 38 further determines whether it is a delayed CTI and whether the affiliated DI is valid, by examining B1, step 44. If the CTI is a delayed CTI and the affiliated DI is not valid, the fetch control circuitry 38 generates control signals for the fetch address generation circuitry 40 indicating that the affiliated DI is to be fetched, step 45. In other words, the fetch address generation circuitry 40 generates control signals for the two multiplexors 74a–74b in the next fetch address generation circuitry 40 to select +4 and INCR_PC respectively.

On the other hand, if at step 44, the CTI is not a delayed CTI or the affiliated DI is valid, then the fetch control circuitry 38 further determines whether the CTI in the writeback stage is taken, by examining B2, step 46. If the CTI in the writeback stage is taken, then the fetch control circuitry 38 further determines whether the target instruction for the CTI in the writeback stage has been fetched, by examining B3, step 48. If the target instruction for the CTI in the writeback stage has not been fetched, the fetch control circuitry 38 generates control signals for the fetch address generation circuitry 40 indicating that the target instruction of the CTI in the writeback stage is to be fetched, block 49. In other words, the fetch address generation circuitry 40 generates control signals for the second multiplexor 74b in the next fetch address generation circuitry 40 to select WB_TGT_PC. Since INCR_PC is not being selected, the control signals for the first multiplexor 74a are irrelevant.

If it is determined in step 42 that there is no CTI in the writeback stage, or in step 46 that the CTI in the writeback stage is not taken, or in step 48 that the target instruction for the CTI in the writeback stage is fetched, the fetch control circuitry 38 then determines whether there is a CTI in the execution stage, by examining B4, step 52. If a CTI is in the execution stage, the fetch control circuitry 38 further determines whether the CTI is a delayed CTI and whether its affiliated DI is valid, by examining B5, step 54. If the CTI in the execute stage is a delayed CTI and the affiliated DI is not valid, the fetch control circuitry 38 generates control signals for the fetch address generation circuitry 40 indicating that the affiliated DI is to be fetched, block 55. In other words, the fetch address generation circuitry 40 generates control signals for the two multiplexors 74a-74b in the next fetch address generation circuitry 40 to select +4 and INCR_PC respectively.

On the other hand, if at step 54, either the CTI is not a delayed CTI or the affiliated DI is valid, then the fetch control circuitry 38 further determines whether the CTI in the execution stage is taken, step 56. If the CTI in the execution stage is taken, then the fetch control circuitry 38 further determines whether the target instruction for the CTI in the execution stage has been fetched, step 58. If the target instruction for the CTI in the execution stage has not been fetched, the fetch control circuitry 38 generates control signals for the fetch address generation circuitry 40 indicating that the target instruction of the CTI in the execution stage is to be fetched, block 59. In other words, the fetch address generation circuitry 40 generates control signals for the second multiplexor 74b in the next fetch address generation circuitry 40 to select EX_TGT_PC.

If it is determined in step 52 that there is no CTI in the execution stage, or in step 56 that the CTI in the execution stage is not taken, or in step 58 that the target instruction for the CTI in the execution stage is fetched, the fetch control circuitry 38 then determines whether there is a CTI in the decode stage, step 62. If there is no CTI in the decode stage, the fetch control circuitry 38 generates control signals for the fetch address generation circuitry 40 indicating that instructions are to be fetched along the sequential stream, step 63. In other words, the fetch address generation circuitry 40 generates control signals for the two multiplexors 74a-74b in the next fetch address generation circuitry 40 to select either +4, +8, +12, or +16 and INCR_PC respectively, depending on the number of valid instructions that were returned on the previous fetch.

If at step 62, a CTI is in the decode stage, the fetch control circuitry 38 further determines whether the CTI is a delayed CTI and whether its affiliated DI is valid, step 64. If the CTI is a delayed CTI and the affiliated DI is not valid, the fetch control circuitry 38 generates control signals for the fetch address generation circuitry 40 indicating that the affiliated DI is to be fetched, step 65. In other words, the fetch address generation circuitry 40 generates control signals for the two multiplexors 74a-74b in the next fetch address generation circuitry 40 to select +4 and INCR_PC respectively.

If at step 64, either the CTI is not a delayed CTI or the affiliated DI is valid, then the fetch control circuitry 38 further determines whether the target address of the CTI in the decode stage is valid, step 66. If the target address is not valid, the fetch control circuitry 38 generates control signals for the fetch address generation circuitry 40 indicating no instruction is to be fetched, step 67. In other words, the fetch address generation circuitry 40 generates control signals for the second multiplexor 74b in the next fetch address generation circuitry 40 to select SAVED_SEQ_PC.

If at step 66, the target address of the CTI in the decode stage is valid, then the fetch control circuitry 38 further determines whether the target instruction for the CTI in the decode stage has been fetched, step 68. If the target instruction for the CTI in the execution stage has not been fetched, the fetch control circuitry 38 generates control signals for the fetch address generation circuitry 40 indicating that the target instruction of the CTI in the decode stage is to be fetched, step 69a. In other words, the fetch address generation circuitry 40 generates control signals for the second multiplexor 74b in the next fetch address generation circuitry 40 to select DEC_TGT_PC.

Otherwise, the fetch control circuitry 38 generates control signals for the fetch address generation circuitry 40 indicating that no instruction is to be fetched, step 69b. In other words, the fetch address generation circuitry 40 generates control signals for the second multiplexor 74b in the next fetch address generation circuitry 40 to select SAVED_FETCH_PC.

While the present invention has been described in terms of various embodiments, those skilled in the art will recognize that the invention is not limited to the embodiments described. In particular, while the present invention is being described with an embodiment where the grouping rules guarantee there is at most one CTI per group (thus per pipeline stage), it will be appreciated that the present invention may be practiced with more than one CTI per group provided the storage circuitry 36, the fetch control circuitry 38, and the fetch address generation circuitry 40, are adjusted correspondingly to track and account for the state information of all permutations. Thus, the method and apparatus of the present invention can be practiced with modification and alteration within the spirit and scope of the appended claims. The description is thus to be regarded as illustrative instead of limiting on the present invention.

What is claimed is:

1. An apparatus comprising:

a) storage circuitry coupled to dispatch and execution circuitry of a pipelined computer system for receiving and storing at least first plurality of state information indicative of whether dispatched control transfer instructions are present in various pipeline stages of said pipelined computer system, second plurality of state information indicative of whether the dispatched control transfer instructions in the various pipeline stages are predicted to be taken, and third plurality of state information indicative for the predicted to be taken ones whether corresponding target instructions have been prefetched; and b) control and generation circuitry coupled to said storage circuitry and said execution circuitry for controlling and generating a new prefetch program counter value for instruction prefetching based on at least said stored first, second and third plurality of state information.

2. The apparatus as set forth in claim 1, wherein, said first plurality of state information include state information indicative of whether there is a control transfer instruction in a writeback stage of said pipelined computer system, said second plurality of state information include state information indicative of whether the control transfer instruction in said writeback stage is predicted to be taken, and said third plurality of state information include state information indicative for the predicted to be taken one in said writeback stage whether a target instruction has been prefetched.

3. The apparatus as set forth in claim 2, wherein, said control and generation circuitry controls and generates a next prefetch address for prefetching the target instruction of said control transfer instruction in said writeback stage, if said first plurality of state information include state information that indicates there is a control transfer instruction in said writeback stage, said second plurality of state information include state information that indicates said control transfer instruction in said writeback stage will be taken, and said third plurality of stat information include state information that indicates the target instruction of said control transfer instruction in said writeback stage has not yet been prefetched.

4. The apparatus as set forth in claim 1, wherein, said first plurality of state information include state information indicative of whether there is a control transfer instruction in an execution stage of said pipelined computer system, said second plurality of state information include state information indicative of whether the control transfer instruction in said execution stage is predicted to be taken, and said third plurality of state information include state information indicative for the predicted to be taken one in said execution stage whether a target instruction has been prefetched.

5. The apparatus as set forth in claim 4, wherein, said control and generation circuitry controls and generates a next prefetch address for prefetching a target instruction of said control transfer instruction in said execution stage, if said first plurality of state information include state information that indicates there is a control transfer instruction in said execution stage, said second plurality of state information include state information that indicates the control transfer instruction in said execution stage will be taken, and said third plurality of state information indicates the target instruction of said control transfer instruction in said execution stage has not yet been prefetched.

6. The apparatus as set forth in claim 1, wherein, said first plurality of state information include state information indicative of whether there is a control transfer instruction in a decode stage of said pipelined computer system, said second plurality of state information include state information indicative of whether the control transfer instruction in said decode stage is predicted to be taken, and said third plurality of state information include state information indicative for the predicted to be taken one whether a target instruction has been prefetched.

7. The apparatus as set forth in claim 6, wherein, said control and generation circuitry controls and generates a next prefetch address for prefetching a target instruction of said control transfer instruction in said decode stage, if said first plurality of state information include state information that indicates there is a control transfer instruction in said decode stage, said second plurality of state information include state information that indicates a target address of said control transfer instruction in said decode stage is valid, and said third plurality of state information include state information indiciative for the valid target address whether a target instruction of said control transfer instruction in said decode stage has not yet been prefetched.

8. The apparatus as set forth in claim 1, wherein, said control and generation circuitry comprises:

b.1) generation circuitry for generating a next prefetch address, said generation circuitry being coupled to said execution unit of said pipelined computer system for receiving target addresses of control transfer instructions in writeback, execute and decode stages as inputs; and b.2) fetch control circuitry coupled to said storage circuitry and said generation circuitry for controlling said generation of the next prefetch address based on said stored first, second, and third pluralities of state information of said control transfer instructions in said writeback, execute and decode stages of said pipelined computer system.

9. The apparatus as set forth in claim 1, wherein said storage circuitry, and said control and generation circuitry are disposed on an instruction prefetch and dispatch unit of said pipelined computer system.

10. The apparatus as set forth in claim 9, wherein said instruction prefetch and dispatch unit further comprises a first and a second instruction fetch queue, dynamically designated as a sequential instruction fetch queue and a target instruction fetch queue.

11. The apparatus as set forth in claim 1, wherein said computer system further comprises an instruction cache for caching instructions to be fetched, and a data cache for caching data being fetched for execution as well as data being written back as a result of execution.

12. A method comprising the steps of:

a) storing first plurality of state information indicative of whether dispatched control transfer instructions are present in various pipeline stages of a pipelined computer system, second plurality of state information indicative of whether the dispatched control transfer instructions in the various pipeline stages are predicted to be taken, and third state information indicative for the predicted to be taken one whether corresponding target instructions have been prefetched; and b) controlling and generating a new prefetch program counter value for instruction prefetching based on said stored first, second, and third pluralities of state information.

13. The method as set forth in claim 12, wherein, said step (a) comprises storing state information of said first plurality of state information indicative of whether there is a control transfer instruction in a writeback stage of said pipelined computer system, storing state information of said second plurality of state information indicative of whether the control transfer instruction in said writeback stage is predicted to be taken, and storing state information of said third plurality of state information indicative for a predicted to be taken one in the writeback stage whether the target instruction has been prefetched.

14. The method as set forth in claim 13, wherein, said step (b) comprises controlling and generating a next prefetch address for prefetching the target instruction of said control transfer instruction in said writeback stage, if said first plurality of state information include state information that indicates there is a control transfer instruction in said writeback stage, said second plurality of state information include state information that indicates said control transfer instruction in said writeback stage will be taken, and said third plurality of state information indicates that the target instruction of said control transfer instruction in said writeback stage has not yet been prefetched.

15. The method as set forth in claim 12, wherein, said step (a) comprises storing state information of said first plurality of state information indicative of whether there is a control transfer instruction in an execution stage of said pipelined computer system, storing state information of said second plurality of state information indicative of whether said control transfer instruction in said execution stage is predicted to be taken, and storing state information of said third plurality of state information indicative of whether the target instruction of said control transfer instruction has been prefetched.

16. The method as set forth in claim 15, wherein, said step (b) comprises controlling and generating a next prefetch address for prefetching the target instruction of said control transfer instruction in said execution stage, if said first plurality of state information include state information that indicates there is a control transfer instruction in said execution stage, said second plurality of state information include state information that indicates the control transfer instruction in said execution stage will be taken, and said third plurality of state information include state information that indicates a target instruction of said control transfer instruction in said execution stage has not yet been prefetched.

17. The method as set forth in claim 12, wherein, said step (a) comprises storing state information of said first plurality of state information indicative of whether there is a control transfer instruction in a decode stage of said pipelined computer system, storing state information of said second plurality of state information indicative of whether said control transfer instruction in said decode stage is predicted to be taken, and storing state information of said third plurality of state information indicative of whether the predicted taken one in said decode stage has been prefetched.

18. The method as set forth in claim 17, wherein, said step (b) comprises controlling and generating a next prefetch address for prefetching a target instruction of said control transfer instruction in said decode stage, if said first plurality of state information include state information that indicates there is a control transfer instruction in said decode stage, said second plurality of state information include state information that indicates a target address of said control transfer instruction in said decode stage is valid, and said third plurality of state information include state information indiciative for the valid target address whether a target instruction of said control transfer instruction in said decode stage has not yet been prefetched.

19. A method for providing a prefetch and dispatch unit with an improved instruction prefetch rate, said method comprising the steps of:

a) providing storage circuitry coupled to execution circuitry of a pipelined computer system for receiving and storing a first plurality of state information indicative of whether dispatched control transfer instructions are present in various pipeline stages of said pipelined computer system, a second plurality of state information indicative of whether the dispatched control transfer instructions in the various pipeline stages are predicted to be taken, and third pluarlity of state information indicative for the predicted taken ones whether corresponding target instructions have been prefetched; and b) providing control and generation circuitry coupled to said storage circuitry and said execution circuitry for controlling and generating a new prefetch program counter value for instructions prefetching based on said stored first and second pluralities of state information.

20. The method as set forth in claim 19, wherein, said step (b) comprises the steps of:

b.1) providing generation circuitry for generating a next prefetch address, said generation circuitry being coupled to said execution unit of said pipelined computer system for receiving target addresses of control transfer instructions in writeback, execute and decode stages as inputs; and b.2) providing fetch control circuitry coupled to said storage circuitry and said generation circuitry for controlling said generation of the next prefetch address based on said stored first, second and third pluralities of state information of said control transfer instructions in said stages of said pipelined computer system.

* * * * *